(12) United States Patent
Mackert

(10) Patent No.: US 11,857,087 B2
(45) Date of Patent: *Jan. 2, 2024

(54) SEATING FURNITURE CHASSIS

(71) Applicant: Innotec Motion GmbH, Lippstadt (DE)

(72) Inventor: Michael Mackert, Rüthen (DE)

(73) Assignee: Innotec Motion GmbH, Lippstadt (DE)

(*) Notice: Subject to any disclaimer, the term of this patent is extended or adjusted under 35 U.S.C. 154(b) by 156 days.

This patent is subject to a terminal disclaimer.

(21) Appl. No.: 17/371,594

(22) Filed: Jul. 9, 2021

(65) Prior Publication Data

US 2021/0330089 A1 Oct. 28, 2021

Related U.S. Application Data

(63) Continuation of application No. PCT/EP2020/050509, filed on Jan. 10, 2020.

(30) Foreign Application Priority Data

Jan. 10, 2019 (DE) .................. 202019100105.4

(51) Int. Cl.
*A47C 1/024* (2006.01)
*A47C 1/032* (2006.01)
(Continued)

(52) U.S. Cl.
CPC .............. *A47C 7/72* (2013.01); *A47C 1/0242* (2013.01); *A47C 31/008* (2013.01);
(Continued)

(58) Field of Classification Search
CPC ......... A47C 1/0242; A47C 7/566; A47C 7/58; A47C 7/72; A47C 1/03211; A47C 4/02;
(Continued)

(56) References Cited

U.S. PATENT DOCUMENTS 3,989,298 A * 11/1976 Cycowicz ................ A47C 4/02
297/317
4,360,962 A * 11/1982 Suzuki ............. H01B 13/01245
29/56.6

(Continued)

FOREIGN PATENT DOCUMENTS

DE 102017111532 A1 11/2018
JP 2008260327 A * 10/2008

(Continued)

OTHER PUBLICATIONS 9 page PDF or Translation of the Witten Opinion dated Mar. 27, 2020 for PCT/EP2020/050509. (Year: 2020).*

(Continued)

*Primary Examiner* — Robert Canfield
(74) *Attorney, Agent, or Firm* — Edell, Shapiro & Finnan, LLC

(57) ABSTRACT

A seating furniture chassis comprises a base body, a plurality of electrically conductive cables fastened to the base body, and a central connector. Each of the electrically conductive cables has a first end and a second end. The first end of each electrically conductive cable has an individual connector that is electrically connectable to a peripheral electrical device. Each of the electrically conductive cables is electrically connected at the second end to the central connector. The central connector is connectable to a central electrical device (e.g., a control unit). The central electrical device is configured to receive and process first control signals from an operating device. The central electrical device is further configured to generate second control signals and emit the second control signals to a drive mechanism.

11 Claims, 3 Drawing Sheets

(51) Int. Cl.
  *B60N 2/02* (2006.01)
  *B60R 16/02* (2006.01)
  *A47C 7/72* (2006.01)
  *A47C 31/00* (2006.01)
  *H01B 7/00* (2006.01)
  *B64D 11/06* (2006.01)
  *B60N 2/68* (2006.01)
  *B60N 2/75* (2018.01)

(52) U.S. Cl.
  CPC ........... *B60N 2/0228* (2013.01); *B60N 2/682* (2013.01); *B60N 2/787* (2018.02); *B60R 16/0207* (2013.01); *B64D 11/0624* (2014.12); *H01B 7/0045* (2013.01); *B60N 2/0264* (2023.08); *B60N 2/02246* (2023.08); *B60N 2002/684* (2013.01)

(58) Field of Classification Search
  CPC .. B60N 2/0228; B60N 2/0232; B60N 2/5678; B60N 2/682; B60N 2/787; B60N 2002/0264; B60N 2002/684; B64D 11/0624; H01B 7/0045; B60R 16/0207
  USPC ......... 297/85 C, 85 M, 217.3, 217.4, 440.14, 297/440.15
  See application file for complete search history.

(56) References Cited

U.S. PATENT DOCUMENTS

| | | | | |
|---|---|---|---|---|
| 4,448,381 A * | 5/1984 | Anspaugh | ............ | B60N 2/0296 248/394 |
| 4,815,984 A * | 3/1989 | Sugiyama | ........... | B60R 16/0239 296/146.7 |
| 4,890,888 A * | 1/1990 | Kostin | ..................... | B60N 2/68 297/440.21 |
| 5,005,908 A * | 4/1991 | Young | ..................... | A47C 7/40 24/653 |
| 5,184,871 A * | 2/1993 | LaPointe | .................. | A47C 7/42 403/374.5 |
| 5,483,853 A * | 1/1996 | Moradell | ............. | B60N 2/2231 248/419 |
| 5,807,177 A | 9/1998 | Takemoto et al. | | |
| 6,011,318 A * | 1/2000 | Mayoras | .............. | B60N 2/7094 361/826 |
| 6,240,779 B1 * | 6/2001 | Kung | .................... | G01P 15/093 73/382 R |
| 6,429,544 B1 * | 8/2002 | Sasaki | .................. | B60N 2/0232 307/10.1 |
| 6,720,671 B2 * | 4/2004 | Kondo | .................. | B60N 2/002 174/72 A |
| 6,752,464 B1 * | 6/2004 | Tseng | ...................... | A47C 7/42 297/440.16 |
| 7,633,401 B1 * | 12/2009 | Copley | ................ | A47C 31/008 340/687 |
| 8,500,194 B2 * | 8/2013 | Fischer | ................ | B60N 2/5685 297/180.12 |
| 9,010,851 B2 * | 4/2015 | LaPointe | ............ | A47C 1/03205 297/85 M |
| 9,277,824 B2 * | 3/2016 | Breen | .................. | A47C 1/0355 |
| 9,931,999 B2 * | 4/2018 | Line | .................... | B60N 2/42709 |
| 9,987,950 B2 * | 6/2018 | Yadav | .................. | H01R 13/73 |
| 10,239,621 B2 * | 3/2019 | Hoch | ................ | B64D 11/00155 |
| 10,252,651 B2 * | 4/2019 | Bhatia | ...................... | B60N 2/20 |
| 11,406,192 B1 * | 8/2022 | Wu | .......................... | A47C 4/02 |
| 11,440,492 B2 * | 9/2022 | Golen | .................... | B60N 2/002 |
| 11,560,078 B2 * | 1/2023 | Sugiyama | ................ | A47C 7/72 |
| 2001/0008814 A1 * | 7/2001 | Tsukamoto | ......... | B60R 16/0215 439/502 |
| 2002/0019165 A1 * | 2/2002 | Aoki | .................. | B60R 16/0207 439/502 |
| 2003/0098661 A1 * | 5/2003 | Stewart-Smith | ..... | B60N 2/0248 318/445 |
| 2005/0077774 A1 * | 4/2005 | Schwarz | ................ | B60N 2/686 297/452.18 |
| 2007/0267212 A1 * | 11/2007 | Nachbauer | ............. | H01R 29/00 174/70 R |
| 2010/0027232 A1 * | 2/2010 | Kasuya | ............... | B60R 16/0215 361/807 |
| 2011/0109133 A1 * | 5/2011 | Galbreath | ............ | B60N 2/0232 297/452.48 |
| 2013/0008713 A1 * | 1/2013 | Fujioka | .................... | H02G 3/30 174/72 A |
| 2013/0146353 A1 * | 6/2013 | Shimada | .............. | H02G 3/0406 174/72 A |
| 2013/0146354 A1 * | 6/2013 | Shimada | ................ | H01B 17/38 174/72 A |
| 2013/0180777 A1 * | 7/2013 | Shibata | .................... | H02G 3/02 174/72 A |
| 2015/0076883 A1 * | 3/2015 | LaPointe | ............... | A47C 1/0355 297/354.1 |
| 2016/0082904 A1 * | 3/2016 | Marks | ..................... | B32B 5/028 428/99 |
| 2017/0105540 A1 * | 4/2017 | Jacobs | ..................... | A47C 4/06 |
| 2017/0149181 A1 * | 5/2017 | Nelson | ..................... | A47C 21/003 |
| 2017/0150264 A1 * | 5/2017 | Nelson | ............... | A61H 23/0236 |
| 2017/0283068 A1 * | 10/2017 | Udriste | ............ | B64D 11/06395 |
| 2017/0293281 A1 * | 10/2017 | Li | ......................... | A47C 1/0242 |
| 2018/0041354 A1 * | 2/2018 | Nelson | ................... | A47C 7/727 |
| 2019/0038229 A1 * | 2/2019 | Perraut | ................. | A61H 9/0078 |
| 2020/0223379 A1 * | 7/2020 | Kikkawa | ............... | B60R 16/027 |
| 2021/0145184 A1 * | 5/2021 | High, Jr. | .................. | A47C 7/72 |
| 2021/0225555 A1 * | 7/2021 | Mizushita | ........ | H01B 13/01209 |

FOREIGN PATENT DOCUMENTS

| | | | | |
|---|---|---|---|---|
| JP | 2009248677 A | * | 10/2009 | |
| JP | 2010018106 A | * | 1/2010 | |
| JP | 2015074365 A | * | 4/2015 | |
| JP | 2015097435 A | * | 5/2015 | |
| JP | 2015110424 A | * | 6/2015 | |
| KR | 20120057040 A | | 6/2012 | |
| WO | WO-2013001667 A1 | * | 1/2013 | |

OTHER PUBLICATIONS 6 page PDF of translation of JP2009248677A to Tsukamoto. (Year: 2009).*

Search Report in corresponding International Patent Application No. PCT/EP2020/050509, dated Mar. 19, 2020.

* cited by examiner

SEATING FURNITURE CHASSIS

This application is a continuation of International Application No. PCT/EP2020/050509, filed on Jan. 10, 2020, which claims priority under 35 U.S.C. § 119 to Application No. DE 202019100105.4 filed on Jan. 10, 2019, the entire contents of which are hereby incorporated by reference.

TECHNICAL FIELD

The present disclosure relates to a seating furniture chassis.

BACKGROUND

Known seating furniture chassis have a base body and cables fastened thereto. The cables connect peripheral electrical devices, such as drive mechanisms and operating devices, to a central control unit. The cables are fastened to the seating furniture chassis and connected to the electrical devices and the control unit during manufacture.

By contrast, the underlying problem addressed by the present disclosure is to create a more flexible seating furniture chassis. In addition, a method for the assembly of such a seating furniture is to be created.

SUMMARY

The seating furniture chassis comprises a base body and a plurality of electrical cables that are fastened to the base body. In the context of this specification, a base body is understood to mean, in particular, a construct that comprises a seat frame and one or more feet with which the seating furniture chassis is erectable on a floor surface. The seat frame can frame a seat. A user can sit on the upholstery after upholstering the seat surface.

Each of the cables has at a first end an individual connector, which is electrically connectable to a peripheral electrical device. Because each of the individual connectors is connectable to one of the peripheral electrical devices, the cables can be, in particular, connectable to a plurality of peripheral devices. In the context of this specification, an individual connector is understood to mean, in particular, a plug or a socket.

The seating furniture chassis also comprises a central connector. Each of the cables is electrically connected to the central connector at a second end. The second end is arranged opposite the first end. In particular, it is possible for the seating furniture chassis to comprise exactly one single central connector. In the context of this specification, the central connector is understood to mean, in particular, a plug or a socket.

Due to the connection of the cables to the central connector, for example, a control unit can be connected to the cables in a particularly simple manner by plugging the central connector into the control unit. An exchange or retrofitting of the control unit is therefore particularly simple.

It is possible, for example, for the cables to always be arranged on the seating furniture chassis, regardless of whether the seating furniture chassis is equipped with electrical devices or not. If, for example, a user acquires a piece of seating furniture with a seating furniture chassis that he or she has purchased without electrical devices, the user can simply acquire and retrofit the electrical devices and the control unit after the fact according to his or her requirements by connecting the cables to the subsequently purchased devices and the control unit. Due to the use of the central connector, the effort on the part of the user is particularly low. In addition, the cabling is already fastened to the seating furniture chassis, so that the risk of incorrect cabling is reduced. The cables can be arranged, for example, such that they respectively protrude into a receiving space for the peripheral electrical device to be connected to the respective cable. In this case, it is immediately clear to the user which cable is to be connected to the installed device.

It is also possible for one of the cables and/or one of the individual connectors and one of the peripheral electrical devices to have the same color, so that a user can simply discern which cable or individual connector is to be connected to which peripheral electrical device.

As a result of the cabling and the use of the central connector, the seating furniture chassis can also be expanded in a particularly simple manner with peripheral electrical devices. The exchangeability of peripheral electrical devices is also simplified.

According to a disclosed embodiment, the central connector can be connectable to a central electrical device. The central electrical device can be designed, for example, as a control unit.

According to a disclosed embodiment, the seating furniture chassis can comprise the peripheral electrical devices.

According to a disclosed embodiment, the seating furniture chassis can comprise the central electrical device.

According to a disclosed embodiment, the peripheral electrical devices can comprise an operating device and/or a drive mechanism. An operating device is understood to mean, in particular, a device that can be used by a user in order to control the drive mechanism. A drive mechanism is understood to mean, in particular, an electric motor.

According to a disclosed embodiment, the central electrical device can be designed in order to receive and process first control signals from the operating device.

According to a disclosed embodiment, the central electrical device can be designed in order to generate second control signals and emit them to the drive mechanism as a function of the first control signals. For example, the first control signal can comprise an indication that a user wishes to change the inclination of a backrest or wishes to extend or retract a footrest. In this case, the second control signal can comprise an indication of a rotational direction of the corresponding drive mechanism.

According to a disclosed embodiment, the central electrical device can be configured to automatically detect the peripheral electrical devices. In the context of this specification, this is understood to mean, in particular, that the detection occurs without user interaction. In addition, the central electrical device can be designed in order to detect a type and a functional scope of the peripheral electrical devices. In this manner, it is particularly simple for a user to exchange or reconnect peripheral electrical devices. Thus, for example, the functions of the seating furniture chassis can be expanded or changed.

The central electrical device can comprise a communication device for a wireless communication. The wireless communication can be, for example, Bluetooth and/or WLAN. For example, a remote diagnosis and/or a remote maintenance of the central electrical device and/or the peripheral electrical devices can occur via the communication device. The central electrical device can thus be designed in order to output an error message via the communication device.

It is also possible for the communication device to be configured to be wirelessly connected to a smartphone.

Functions of the central electrical device and/or the peripheral electrical devices can thus be controlled via the smartphone.

According to a disclosed embodiment, the cables can be designed as a cable harness. This is understood to mean, in particular, that the cables are arranged in bundles. The cable harness can have been, for example, preassembled for the seating furniture chassis during manufacture so that the assembly is particularly simple.

According to a disclosed embodiment, the peripheral electrical devices can each comprise a data memory and a signal processor. The data memory can be configured, in particular, as a digital data memory. The signal processor can be referred to as a processor, for example. The signal processor can be configured to read out the data memory.

In this manner, the peripheral electrical devices can communicate with the central electrical device. This is particularly advantageous so that the central electrical device can automatically detect the peripheral electrical devices. A user can then simply reconnect one of the peripheral electrical devices, wherein the central electrical device can control this peripheral electrical device without further interaction on the part of the user.

The peripheral electrical devices can also comprise a plug and/or a socket, with which they can each be connected to one of the individual connectors.

It is also possible for the seating furniture chassis to comprise a multimedia unit, which can be controlled via the central electrical device. A user can then control the multimedia unit, for example, via an operating element of the central electrical device and/or via a smartphone. The multimedia unit can be designed, for example, to play back images, videos, and/or sounds.

In addition, the peripheral electrical devices can comprise a sensor. The sensor can be configured, for example, to detect whether a person is sitting on the seating furniture chassis. This can occur, for example, via the weight force exerted by the person.

In addition, the peripheral electrical devices can comprise further sensors configured to monitor vital signs of a person sitting on the seating furniture chassis. If, for example, no vital signs are detected, although it is simultaneously detected that a person is sitting on the seating furniture chassis, then an alarm can be triggered.

The peripheral electrical devices can comprise, for example, a footrest drive mechanism and a backrest drive mechanism. In this case, the central electrical device can comprise a manual switch and/or a control panel. The footrest drive mechanism can be configured to move a footrest of the seating furniture chassis. The backrest drive mechanism can be configured to move a backrest of the seating furniture chassis. The hand switch and/or the control panel can be designed in order to control the footrest drive mechanism and/or the backrest drive mechanism. The control panel can be designed as a touchscreen, for example.

In addition, the peripheral electrical devices can also comprise a headrest drive mechanism, which can be configured to move a headrest of the seating furniture chassis. The headrest drive mechanism can also be controllable with the hand switch and/or the control panel.

Additionally or alternatively, the peripheral electrical devices can comprise a stand-up aid. The stand-up aid can be designed in order to tilt a seat of the seating furniture chassis. The stand-up aid can also be controlled with the hand switch and/or the control panel.

According to a disclosed embodiment, the seating furniture chassis can comprise a back part. The back part can be fastenable to the base body. The central electrical device can be arranged on the back part. In the context of this specification, a back part is understood to mean, in particular, a component that is fastened to a rear of the base body. When the seating furniture chassis is used as intended, the rear is the side of the base body that is arranged behind a user sitting on the seat frame.

According to a disclosed embodiment, the back part can comprise a backrest.

According to a disclosed embodiment, the drive mechanism can be arranged on the base body.

According to a disclosed embodiment, the seating furniture chassis can comprise a side part. The side part can be fastened to the base body. The operating device can be arranged on the side part. The arrangement of the operating device on the side part is particularly simple to achieve by a user sitting on the seating furniture chassis. In the context of this specification, a side part is understood to mean, in particular, a component which, when the seating furniture chassis is used as intended, is arranged laterally next to a user sitting on the seat frame. The side part can comprise an armrest, for example.

In the method, the cables are fastened to the base body and electrically connected to the peripheral electrical devices via the individual connectors. In addition, the cables are connected to the central electrical device via the central connector.

BRIEF DESCRIPTION OF THE DRAWINGS

Further features and advantages of the disclosed furniture seat chassis will become apparent from the following description of preferred exemplary embodiments with reference to the fastened drawings. The same reference numerals are used for the same and similar components as well as for components having the same or similar functions. The figures show.

DETAILED DESCRIPTION

Cables 100 are each connected at a first end to a single plug 101, which can be plugged into a socket. It is also possible to connect the cables to a socket, into which a plug can be inserted. The cables 100 are also connected at their second end to a central plug 102, which can be plugged into a socket. It is also possible to connect the cables to a central socket, into which a plug can be inserted.

Due to the use of the central plug 102, a central electrical device can be electrically connected to the cables in a particularly simple manner, so that the central electrical device can be connected after the fact, for example by a user. In addition, the use of the central plug 102 reduces the risk of incorrect contacting.

Figure 1:
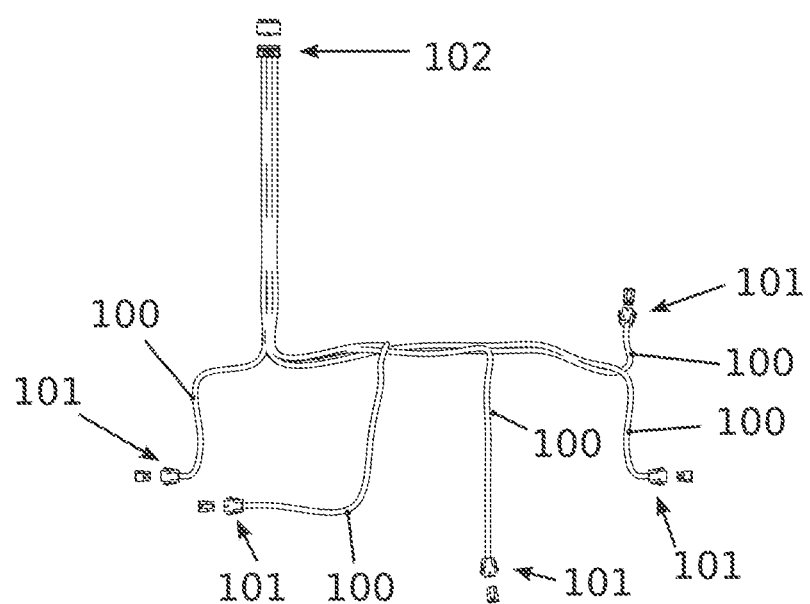
FIG. 1 is a schematic perspective view of a plurality of cables for use in a seating furniture chassis according to a disclosed embodiment.
Figure 2:
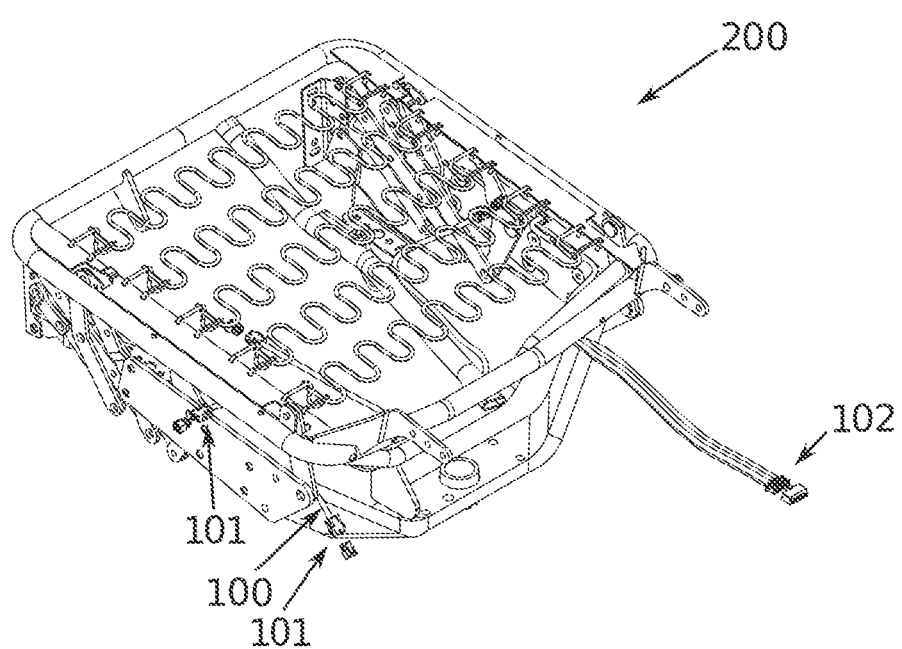
FIG. 2 is a schematic perspective view of a seating furniture chassis according to a disclosed embodiment.

FIG. 2 shows that the cables 100 are fastened to the base body 200 of a seating furniture chassis. Here, the plugs 101 at the first end of the cables are arranged such that they can be connected in a particularly simple manner to electrical peripheral devices, such as a motor or an operating device. Due to this arrangement, it is particularly simple for a user to correctly electrically connect the peripheral electrical device to the central electrical device.

Figure 3:
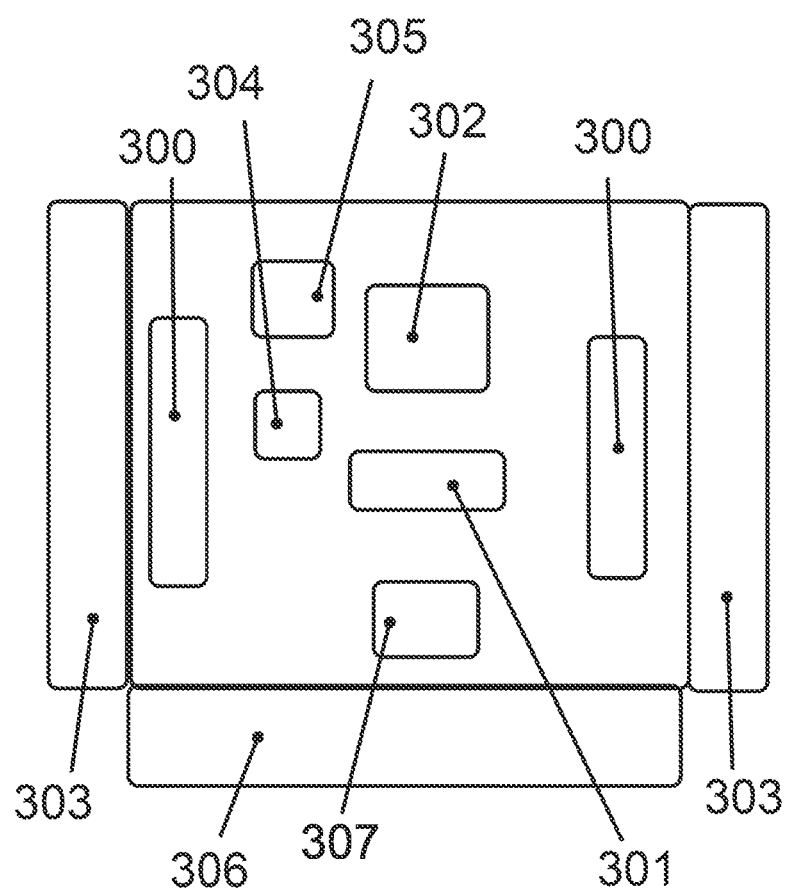
FIG. 3 is a schematic top view of a seating furniture chassis according to an example embodiment of the present invention.

Referring now to FIG. 3, an example embodiment of a seating furniture chassis according to the present invention is depicted and will now be described.

As shown in FIG. 3, the example seating furniture chassis can comprise a plurality of peripheral electrical devices 300, a central electrical device 301, an operating device 302, side parts 303, a data memory 304, a signal processor 305, a back part 306, and a drive mechanism 307. As described herein, the peripheral electrical devices can communicate with the central electrical device, which is advantageous because it allows the central electrical device to detect and control the peripheral electrical devices.

As further described herein, the operating device 302 can be used by a user to control a drive mechanism 307, such as an electric motor. First control signals from the operating device can be received and processed by the central electrical device. The central electrical device can be designed to generate second control signals and emit them to the drive mechanism as a function of the first control signals. Additionally, the data memory 304 can be configured as a digital data memory and the signal processor 305 can be configured to read out the data memory.

Furthermore, the side parts 303 and the back part 306 can be fastened to the base body 200 (FIG. 2). As described herein, the side parts comprise a component which, when the seating furniture chassis is used as intended, is arranged laterally next to a user sitting on a seat frame of the base body. The side part, for example, can be an armrest. Similarly, the back part comprises a component that is fastened to a rear of the base body. When the seating furniture chassis is used as intended, the rear is the side of the base body that is arranged behind the user sitting on the seat frame. The back part, for example, can comprise a backrest.

What is claimed is:

1. A seating furniture chassis comprising:
    a base body;
    a plurality of electrically conductive cables fastened to the base body, each cable having a first end and a second end;
    a central electrical device;
    a central connector connectable to the central electrical device; and
    a plurality of peripheral electrical devices,
    wherein each of the electrically conductive cables has an individual connector at the first end that is electrically connectable to one of the peripheral electrical devices,
    wherein each of the electrically conductive cables is electrically connected at the second end to the central connector,
    wherein the peripheral electrical devices comprise an operating device which produces first control signals, and
    wherein the central electrical device is configured to receive and process the first control signals from the operating device.

2. The seating furniture chassis of claim 1, wherein the peripheral electrical devices comprise a drive mechanism.

3. The seating furniture chassis of claim 2, wherein the drive mechanism is arranged on the base body.

4. The seating furniture chassis of claim 2, wherein the central electrical device is configured to generate second control signals and to emit the second control signals to the drive mechanism as a function of the first control signals.

5. The seating furniture chassis of claim 1, wherein:
    the seating furniture chassis comprises a side part fastenable to the base body, and
    the operating device is arranged on the side part.

6. The seating furniture chassis of claim 1, wherein the central electrical device is configured to automatically detect the peripheral electrical devices.

7. The seating furniture chassis of claim 1, wherein the electrically conductive cables are designed as a cable harness.

8. The seating furniture chassis of claim 1, wherein the peripheral electrical devices each comprise a data memory and a signal processor.

9. The seating furniture chassis of claim 1, wherein:
    the seating furniture chassis comprises a back part,
    the back part is fastenable to the base body, and
    the central electrical device is arranged on the back part.

10. The seating furniture chassis of claim 9, wherein the back part comprises a backrest.

11. A method for assembly of a seating furniture chassis of claim 1, the method comprising:
    fastening the electrically conductive cables to the base body;
    electrically connecting the electrically conductive cables to the peripheral electrical devices via the individual connectors; and
    electrically connecting the electrically conductive cables to the central electrical device via the central connector.

* * * * *